United States Patent [19]
Gupta et al.

[11] Patent Number: 5,226,479
[45] Date of Patent: Jul. 13, 1993

[54] FRACTURING FLUID HAVING A DELAYED ENZYME BREAKER

[75] Inventors: D. V. Satyanarayana Gupta; Marek K. Pakulski, both of The Woodlands; Bethicia M. Prasek, Houston, all of Tex.

[73] Assignee: The Western Company of North America, Houston, Tex.

[21] Appl. No.: 818,526

[22] Filed: Jan. 9, 1992

[51] Int. Cl.$^5$ .................................. E21B 43/267
[52] U.S. Cl. .................................. 166/300; 166/308; 252/8.551
[58] Field of Search .................................. 166/300, 308; 252/8.551

[56] References Cited

U.S. PATENT DOCUMENTS

| | | | |
|---|---|---|---|
| 3,167,510 | 1/1965 | Alter . | |
| 3,684,710 | 8/1972 | Cayle et al. | 252/8.551 |
| 3,885,630 | 5/1975 | Richardson | 166/307 |
| 4,002,204 | 1/1977 | Cavin | 166/294 |
| 4,247,430 | 1/1981 | Constien | 166/276 X |
| 4,259,205 | 3/1981 | Murphey | 252/326 |
| 4,368,136 | 1/1983 | Murphey | 252/316 |
| 4,506,734 | 3/1985 | Nolte | 166/308 |
| 4,619,776 | 10/1986 | Mondshine | 252/8.551 |
| 4,749,040 | 6/1988 | Hodge | 166/308 |
| 4,770,796 | 9/1988 | Jacobs | 252/8.553 |
| 4,809,781 | 3/1989 | Hoefner | 166/273 |
| 4,829,100 | 5/1989 | Murphey et al. | 523/131 |
| 4,942,186 | 7/1990 | Murphey et al. | 523/131 |
| 5,055,209 | 10/1991 | Bridges et al. | 166/300 X |
| 5,067,566 | 11/1991 | Dawson | 252/8.551 X |

*Primary Examiner*—George A. Suchfield
*Attorney, Agent, or Firm*—Peter A. Bielinski

[57] ABSTRACT

The invention is directed toward a breaker system for breaking fluids used to fracture subterranean formations. Specifically, the invention relates to a breaker system comprised of an enzyme component and a pH component. The enzyme component is active at only certain pH levels and, at those levels, is able to break the fluid. The fluid is not initially at a pH level at which the enzyme is active. The pH component controllably adjusts the pH of the fluid to a level such that the enzyme becomes active and can break the fluid at the desired time after the formation has been fractured.

7 Claims, No Drawings

FRACTURING FLUID HAVING A DELAYED ENZYME BREAKER

FIELD OF THE INVENTION

The invention relates to methods for treating subterranean formations. Specifically, the invention is directed to methods to fracture subterranean formations and compositions used therewith. Further, the invention is directed to methods of fracturing subterranean formations utilizing a fracturing composition which includes a delayed enzyme breaker system.

BACKGROUND OF THE INVENTION

It is a common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and imposing sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid is withdrawn back into the well. The fracturing fluid has a sufficiently high viscosity to penetrate into the formation to realize fracturing and to retain the proppant in suspension or at least to reduce the tendency of the proppant to settle out of the fracturing fluid. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and the fracturing of the formation has been obtained, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been obtained by adding a "breaker," that is, a viscosity-reducing agent, to the subterranean formation at the desired time. However, known techniques can be unreliable and at times result in incomplete breaking of the fluid and/or premature breaking of the fluid before the fracturing process is complete. Premature breaking can cause a decrease in the number of fractures obtained and thus, the amount of hydrocarbon recovery.

There have been several proposed methods for the breaking of fracturing fluids which were aimed at eliminating the above problems. For example, methods for breaking well-treating fluids containing guar gum as a viscosity-imparting additive are known in the art. One such method includes the use of enzyme preparations. The use of enzyme preparations is effective in bringing about a rapid breaking of the fracturing fluid, but such enzyme use possesses a number of disadvantages. The enzyme is generally mixed with the guar gum in the dry state. This mixture is fairly stable in storage, but as soon as the preparation is hydrated, enzyme action commences and the guar gum is hydrolyzed. The guar gum is hydrated at the surface before it is injected into the well. As long as two hours may be required to hydrate the gum, and during that time a considerable degree of hydrolysis will take place. To compensate for this loss, additional quantities of guar gum must be used initially. See U.S. Pat. No. 3,167,510.

U.S. Pat. No. 3,684,710 discloses a combination of two enzymes from different microbiological sources with the same substrate specificity, but with different characteristics with respect to pH-activity and pH-stability. The patent teaches that due to the extreme sensitivity of enzymes to changes in pH it has been found that the usefulness of many enzyme systems in practical commercial processes is severely limited or else the systems are subject to less than optimum usage. The patent teaches the use of two enzymes, one being active from pH of 5–7.5 and one being active from pH of 2.5–5 to break fracturing fluids. The patent teaches that the natural pH of the earth, which is generally below 9, serves to activate the enzymes and the enzymes exhibit activity over the pH range of 2.5–7.5. Thus, the system is dependent on the pH of the subterranean formation and does not provide a system wherein the pH is controlled and thus the combination of two enzymes is necessary due to the fact that the pH of different subterranean formations is not the same but is only generally below 9.0.

U.S. Pat. No. 4,506,734 also provides a method for reducing the viscosity and the resulting residue of an aqueous or oil-based fluid introduced into a subterranean formation by introducing a viscosity-reducing enzyme contained within hollow or porous, crushable and fragile beads along with a fluid, such as a hydraulic fracturing fluid, under pressure into the subterranean formation. When the fracturing fluid passes or leaks off into the formation or the fluid is removed by back flowing, any resulting fractures in the subterranean formation close and crush the beads. The crushing of the beads then releases the enzyme into the fluid. This process is dependent upon the pressure of the formation to obtain release of the enzyme breaker and is thus, subject to varying results dependent upon the formation and its closure rate.

Enzyme breakers for fracturing fluids also suffer from another disadvantage. Enzymes are generally very pH sensitive in that they are not active except at certain pH levels. Most often, the pH of the fracturing fluid does not correspond to the pH at which an enzyme capable of breaking that fluid is active. Also, if the pH of the fluid is at a level wherein an enzyme capable of breaking the fluid is active, then the fluid may be broken prematurely and thus the efficiency of the fracturing process is compromised.

An additional disadvantage of using enzyme preparations includes enzymatic hydrolysis which becomes extremely rapid at temperatures around 140° F. This is a temperature which is commonly found in wells and when it is encountered, the viscosity of the fluid may be reduced by the enzyme below that viscosity required for proppant suspension before the proppant can be forced into the formation and is thus undesirable.

Reducing the viscosity of well-treating fluids in order to facilitate their removal from the producing formation also includes natural breaking done by bacterial degradation or by subjection to high temperatures. These methods suffer from the excessive length of time required to complete the breaking, such as several days or longer.

There remains a need for a method for controlled breaking of fracturing fluids which is more economical and provides not only controlled release of the breaker, but reduces damage to the formation and facilitates well clean-up.

SUMMARY OF THE INVENTION

The invention relates to a method for treating subterranean formations. Specifically, the invention is directed to a method of fracturing subterranean formations utilizing a fracturing fluid and controllably breaking said fluid with an enzyme breaker. The present invention is also directed to a composition for fracturing subterranean formations which includes the utilization of an enzyme breaker. The present invention is further directed to an enzyme breaker system for controllably breaking fracturing fluids. The breaker system of the invention is comprised of an enzyme component which is active at certain pH levels and is capable of breaking the fluid at those levels and a pH component which adjusts the pH of the fluid to the level whereby the enzyme becomes active and breaks the fluid.

DETAILED DESCRIPTION

The method of the present invention is directed to the treating or fracturing of subterranean formations with water solvatable, enzyme digestible bipolymer-based treating or fracturing fluids which are known in the art. For example, the method of the present invention is directed to fracturing subterranean formations using fracturing fluids containing polysaccharides such as galactomannan gums, glucomannan gums and their derivatives. Solvatable galactomannan and glucomannan gums are naturally occurring. The galactomannan gums can also be reacted with hydrophilic constituents and thereby produce derivatized polymers useful in the present invention. Solvatable polysaccharides having molecular weights of greater than about 200,000 are preferred in the present invention. The most preferred solvatable polysaccharides useful herein have molecular weights in the range of from about 200,000 to about 3 million. Examples of such polysaccharides include guar gum, locust bean gum, karaya gum, xanthan gum, and guar derivatives such as carboxymethyl guar, hydroxypropyl guar, hydroxyethyl guar, and carboxymethylhydroxypropyl guar. Cellulose derivatives such as hydroxypropyl cellulose, carboxymethyl cellulose, and carboxymethylhydroxypropyl cellulose are also useful in the present invention. The preferred polymers are guar gum, hydroxypropyl guar gum, and carboxymethylhydroxypropyl guar gum. The various fluids used to fracture formations and their compositions are well known in the art and essentially contain a carrier fluid, usually an aqueous liquid, and a viscosifying polymer. The viscosifying polymers are described above. Fracturing fluids usually also contain one or more of the following: surfactants, salts, anti-foaming agents, and polymer thickeners. The fracturing fluid may also contain proppants known in the art.

The present invention is also directed to fracturing fluids which are crosslinked. For example, fracturing fluids which are crosslinked with known crosslinkers like borate, titanate, and zirconate, etc.

The method of the present invention is directed to injecting a subterranean formation with a fracturing fluid as disclosed above, fracturing the formation, and controllably breaking the fracturing fluid by utilizing the delayed enzyme breaker system of the invention. In the practice of the present invention, the enzyme breaker system can be injected with the fracturing fluid. Further, the delayed enzyme breaker system of the present invention can be added to a carrier fluid and then injected into the subterranean formation subsequent to, simultaneous with, or prior to the injection of the fracturing fluid. Enzyme breakers are also often added to the fracturing fluid.

The well treating fluids of the present invention can also be used to carry any other products or chemicals which may be advantageously carried by such a high viscosity fluid.

The delayed enzyme breaker of the present invention is comprised of two principal components: 1) an enzyme component, and 2) a pH component or an enzyme activator. The enzyme component of the present invention is comprised of any enzyme which, at particular concentrations, temperatures, and pH, is capable of breaking a particular polymer-based fracturing fluid. The enzyme utilized in a certain application is dependent on the polymer used as the gelling agent for the fracturing fluid. The concentration of enzyme used depends on the polymer in the fracturing fluid, whether the fluid is crosslinked, the temperature, and also upon the desired break time. Generally, the quicker break time desired the more enzyme used and the quicker the pH of the fluid is adjusted by the pH component. For example, the enzyme component of the present invention may be comprised of cellulases and/or xanthanases. Cellulases are particularly well suited for use with cellulose-based fracturing fluids. Likewise, xanthanases are particularly well suited for use with xanthum gum-based fracturing fluids. However, the enzyme cellulase is also useful in breaking guar gum-based fracturing fluids. Nonetheless, the preferred enzyme will necessarily depend upon the viscosifying polymer used in the fracturing fluid as is known in the art. Further, the preferred concentration of the particular enzyme will also depend upon the temperature of the well, the viscosifying polymer, the desired break time, and the pH.

The pH enzyme activator component of the present invention is comprised of any compounds which react slowly with water to produce acid. The compound preferably forms no significant amount of acid until it is exposed to formation conditions for two hours. Useful examples are acid anhydrides, esters or lactones for example, 4,4'-oxydiphthalic anhydride and γ-butyrolactone. Polymeric acid anhydrides and polymeric hydroxycarboxylic acids are also useful. These examples of the pH components useful in the practice of the present invention are suitable, for example, for use with high pH borate cross-linked hydroxypropyl guar gum-based fracturing fluids wherein the enzyme component is comprised of cellulase. The suitable pH component useful in the practice of the present invention and its concentrations are dependent upon the temperature of the formation, the viscosifying agent employed (and thus the enzyme used), and the rate of breaking desired.

The subterranean formations to be fractured have temperatures typically less than about 250° F. preferably less than 160° F. more preferably less than about 130° F.

In the practice of the present invention, loadings in the range of 0.001–1.0%, preferably 0.01–0.5% and most preferably 0.1–0.3% by weight of pH component and 0.000–5.0%, preferably 0.001–1.0% and most preferably 0.002–0.1% by weight of enzyme component are typical for an eight hour breaking time at about 100° F. Of course, these loadings would be different if a different cellulase is used since each enzyme has a different activity or if different concentrations of polymer or different temperatures are present. For example, 0.05 pounds of enzyme per thousand gallons of gel and one gallon of butyrolactone per thousand gallons of gel are required to break a gel containing 30 pounds of polymer per thousand gallons of fluid in 24 hours at 120° F. On the other hand, 50 pounds of enzyme and five gallons of butyrolactone per thousand gallons of gel (six kilograms of enzyme and five liters of butyrolactone per meter$^3$) are required for a fast break of a gel containing 40 pounds of polymer per thousand gallons of fluid in two hours at a low temperature of 80° F.

The following examples are provided to further illustrate the invention. The examples are not intended to limit the scope of this invention.

EXAMPLES

Example I

A fracturing fluid was prepared by hydration of 4.8 Kg/m$^3$ of a hydroxypropyl guar polymer in water or in a 2% solution of potassium chloride. Aliquots of this base fluid were mixed with potassium carbonate to produce base fluids having a pH in the range from 9 to 10. Thereafter various concentrations of carboxylic acid anhydrides or γ-butyrolactone were added and the pH of the solutions was measured as a function of time and temperature as indicated in Table 1.

TABLE 1

| | | | | Effect of pH Component and Concentration on Gel pH | | | | | | | |
|---|---|---|---|---|---|---|---|---|---|---|---|
| Exp # | pH Component | Conc. % | T °F. | \multicolumn{8}{c}{Gel pH at Time (h)} | | | | | | | |
| | | | | Start | .5 h | 1 h | 2 h | 3 h | 4 h | 5 h | 6 h |
| 1 | BLO$^a$ | 0.1 | 120 | 9 | | | 8.0 | 7.8 | 7.3 | | |
| 2 | BLO | 0.2 | 120 | 9 | | | 7.3 | 6.9 | 6.7 | 6.5 | |
| 3 | BLO | 0.3 | 120 | 9 | | | 7.0 | 6.6 | 6.4 | 6.3 | 6.1 |
| 4 | BLO | 0.3 | 100 | 9 | | 8.2 | 7.8 | 7.4 | 7.1 | 6.9 | 6.7 |
| 5 | BLO | 0.3 | 80 | 9 | | 8.6 | 8.3 | 8.0 | 7.8 | 7.7 | 7.6 |
| 6 | ODPA$^b$ | 0.003 | 120 | 9 | | 8.7 | | 8.4 | 8.3 | | 8.2 |
| 7 | AN-119$^c$ | 0.012 | 120 | 9 | | 6.6 | | 6.4 | 6.3 | | 6.2 |
| 8 | MA$^d$ | 0.012 | 120 | 9 | 5.1 | | | | | | |
| 9 | BTCA$^e$ | 0.012 | 120 | 9 | 6.4 | | | | | | |

$^a$γ-butyrolactone; $^b$4,4'-oxydiphthalic anhydride; $^c$poly(methyl vinyl ether/maleic anhydride; $^d$maleic anhydride; $^e$1,2,4,5-benzenetetracarboxylic anhydride The above examples illustrate that chemical compounds which can hydrolyse to acidic products are capable of decreasing the pH of the gel. Some pH components (Experiments 7, 8 and 9) hydrolyse too quickly to be useful on the present invention, others (Experiment 6) change the gel's pH too slowly for effective use in the present application. γ-butyrolactone (BLO) in concentrations of 0.1% to 0.3% exhibits the desirable property of slowly decreasing the gel's pH.

EXAMPLE II

A base fracturing fluid was prepared as in Example I. Aliquots of this fluid were treated with breakers containing γ-butyrolactone, hemicellulase A (enzyme A), hemicellulase B (enzyme B) and mixtures of enzyme and γ-butyrolactone. Break time tests were performed by placing the gelled fluid samples together with a quantity of breaker into several sample jars. The sample jars were placed into a 80° F., 100° F. and 120° F. water bath. Samples were removed from the baths at about one hour intervals to measure the gel's viscosity @80° F. Samples were cooled if necessary. Changes of the gels viscosity were recorded as a function of time as indicated in Table 2.

TABLE 2

| | | | Effect of Breaker Composition and Temperature on Gel Viscosity | | | | | | | |
|---|---|---|---|---|---|---|---|---|---|---|
| Exp # | Breaker Composition | T °F. | \multicolumn{8}{c}{Gel Viscosity (cP) at Time (h)} | | | | | | | |
| | | | Start | .33 h | .75 h | 1 h | 2 h | 3 h | 4 h | 5 h |
| 1 | BLO 0.2% | 80 | 32.5 | 31.6 | 30.6 | 30.5 | 30.4 | 30.2 | 29.5 | 29.0 |
| 2 | Enzyme A 0.06% | 80 | 32.5 | 31.2 | 29.3 | 28.6 | 28.6 | 27.2 | 25.6 | 25.0 |
| 3 | BLO 0.2% + Enzyme A 0.06% | 80 | 32.5 | 28.9 | 22.9 | 19.1 | 15.6 | 12.0 | 9.4 | |
| 4 | BLO 0.3% + Enzyme A 0.006% | 100 | 32.5 | | | | | 15.0 | 12.0 | 10.0 |
| 5 | BLO 0.3% + Enzyme A 0.003% | 120 | 32.5 | | | | 18.0 | 14.0 | 12.0 | 11.0 |
| 6 | BLOW 0.9% + | 80 | 32.5 | | | | | 15.6 | 12.8 | 10.7 |

TABLE 2-continued

| | Effect of Breaker Composition and Temperature on Gel Viscosity | | | | | | | | |
|---|---|---|---|---|---|---|---|---|---|
| Exp # | Breaker Composition | T °F. | \multicolumn{7}{c}{Gel Viscosity (cP) at Time (h)} | | | | | | |
| | | | Start | .33 h | .75 h | 1 h | 2 h | 3 h | 4 h | 5 h |
| 7 | Enzyme B 0.0018% BLO 0.3% + Enzyme B 0.0018% | 100 | 32.5 | | | | 18.7 | | 11.7 | 9.8 |
| 8 | BLO 0.3% + Enzyme B 0.0018% | 120 | 32.5 | | | 23.0 | 18.0 | | 11.0 | |

The above examples illustrate that breaker components used singularly do not break the fracturing fluid (Experiment 1 and 2). The mixture of both components, γ-butyrolactone and enzyme, break the gel. The progress of the gel breaking process is dependent on temperature and concentration of each component (Experiments 3-8).

EXAMPLE III

A base fracturing fluid was prepared as in Examples I and II. Aliquots of this fluid were treated with mixtures of γ-butyrolactone and Cellulase (A) enzyme at different loadings followed by addition of crosslinking agent, boric acid, sodium borate or sodium calcium borate. The crosslinked fluid was placed in 200 ml glass jars and tightly closed. The sample jars were then submerged in 80° F., 100° F. and 120° F. water baths. The jars were removed periodically and the gel viscosity was recorded at 80° F. Gel viscosity as a function of time is given in Table 3.

TABLE 3

| | Delayed Enzyme Breaker Effect on Gel Viscosity | | | | | | | | |
|---|---|---|---|---|---|---|---|---|---|
| Exp # | BLO Conc. (%) | Cellulase A Conc. (%) | T °F. | \multicolumn{6}{c}{Gel Viscosity (cP) at Time (h)} | | | | | |
| | | | | 3 h | 4 h | 5 h | 6 h | 8 h | 10 h |
| 1 | 0.2 | 0.096 | 80 | 36 | 27 | 21 | 17 | 11 | 9 |
| 2 | 0.2 | 0.0024 | 100 | 27 | 20 | 15 | 13 | 9 | |
| 3 | 0.2 | 0.0024 | 120 | 26 | 18 | 14 | 12 | 8 | |
| 4 | 0.1 | 0.024 | 80 | 27 | 19 | 14 | 12 | 8 | |
| 5 | 0.1 | 0.006 | 100 | 35 | 24 | 18 | 14 | 10 | |
| 6 | 0.1 | 0.0024 | 120 | 40 | 30 | 22 | 17 | 13 | 9 |

The above examples illustrate that the crosslinked gel system is breakable with the delayed enzyme breakers described in the present application.

While the illustrative embodiments of the invention have been described with particularity, it will be understood that various other modifications will be apparent to and can be readily made by those skilled in the art without departing from the spirit and scope of the invention. Accordingly, it is not intended that the scope of claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method of fracturing a subterranean formation comprised of:
    injecting a fracturing fluid and a breaker system into a formation to be fractured, said breaker system comprised of an enzyme component and γ-butyrolactone;
    supplying sufficient pressure on the formation for a sufficient period of time to fracture the formation;
    after fracturing, adjusting the pH of the fluid with γ-butyrolactone whereby the enzyme component becomes active and capable of breaking the fluid;
    breaking the fluid with the enzyme component; and subsequently releasing the pressure on the formation.

2. The method of fracturing of claim 1 wherein the fracturing fluid is comprised galactomannan gums, glucommannan gums, guar gum, locust bean gum, karaya gum, carboxymethyl guar, hydroxyethyl, guar, hydroxypropyl guar, carboxymethylhydroxypropyl guar, carboxymethylhydroxyethyl guar, hydroxypropyl cellulose, hydroxymethyl cellulose, hydroxyethyl cellulose, carboxymethyl cellulose, their derivatives, or mixtures thereof.

3. The method of claim 1 wherein the fracturing fluid is crosslinked.

4. The method of claim 1 wherein the fracturing fluid includes a proppant.

5. The method of claim 1 wherein the subterranean formation to be fractured has a temperature of less than about 160° F.

6. The method of claim 1 wherein the pH of the fracturing fluid when injected is from about 9 to about 12.

7. The method of claim 1 wherein the enzyme component of the breaker system is comprised of cellulases, xanthanase, or mixtures thereof.

* * * * *